(12) United States Patent
Dukes et al.

(10) Patent No.: US 7,285,157 B1
(45) Date of Patent: Oct. 23, 2007

(54) AIR FILTER

(75) Inventors: Helen Dukes, Blackley (GB); John David Payne, Blackley (GB)

(73) Assignee: Arch UK Biocides Limited, West Yorkshire (GB)

( * ) Notice: Subject to any disclaimer, the term of this patent is extended or adjusted under 35 U.S.C. 154(b) by 301 days.

(21) Appl. No.: 10/049,436

(22) PCT Filed: Jul. 26, 2000

(86) PCT No.: PCT/GB00/02878

§ 371 (c)(1),
(2), (4) Date: Jul. 22, 2002

(87) PCT Pub. No.: WO01/12296

PCT Pub. Date: Feb. 22, 2001

(30) Foreign Application Priority Data

Aug. 13, 1999 (GB) ................................ 9919127.2

(51) Int. Cl.
*A61G 17/007* (2006.01)
*D21J 3/10* (2006.01)

(52) U.S. Cl. .................. 96/223; 424/450; 424/488; 424/400; 424/76.21; 424/78.36; 424/78.37; 514/58; 514/937; 536/101; 536/103; 502/404

(58) Field of Classification Search ............... 424/450, 424/488, 400, 76.21, 78.36, 78.37; 514/58, 514/937; 536/103, 101; 510/101; 502/404; 96/223
See application file for complete search history.

(56) References Cited

U.S. PATENT DOCUMENTS

| | | | |
|---|---|---|---|
| 3,892,846 A * | 7/1975 | Wortham ................. 424/76 |
| 5,288,298 A | 2/1994 | Aston | |
| 5,370,721 A | 12/1994 | Carnahan | |
| 5,840,245 A | 11/1998 | Coombs et al. | |
| 5,874,052 A | 2/1999 | Holland | |
| 5,876,489 A | 3/1999 | Kunisaki et al. | |
| 6,436,442 B1 * | 8/2002 | Woo et al. ................. 424/488 |
| 6,548,054 B2 * | 4/2003 | Worley et al. ........... 424/78.36 |
| 2001/0056080 A1 * | 12/2001 | Woo et al. ................. 514/58 |
| 2002/0007055 A1 * | 1/2002 | Uchiyama et al. ......... 536/103 |
| 2002/0010106 A1 * | 1/2002 | Uchiyama et al. ......... 510/101 |
| 2002/0010154 A1 * | 1/2002 | Uchiyama et al. ............ 514/58 |
| 2003/0143187 A1 * | 7/2003 | Worley et al. ........... 424/78.22 |

FOREIGN PATENT DOCUMENTS

| | | | | |
|---|---|---|---|---|
| CN | 1125631 | * | 5/1998 | ................. 96/223 |
| JP | 11253716 | * | 9/1999 | ................. 96/223 |

OTHER PUBLICATIONS

A translation copy in English of the above foreign patents.*

* cited by examiner

*Primary Examiner*—Matthew Savage
*Assistant Examiner*—Minh-Chau T. Pham
(74) *Attorney, Agent, or Firm*—Pillsbury Winthrop Shaw Pittman LLP

(57) ABSTRACT

An air-filter for a circulating and/or recirculating air system using a filter medium containing a microbiologically effective amount of a polymeric biguanide or salt thereof. Also claimed is a method for reducing odors and/or air-borne micro-organisms in a circulating or recirculating air system using the air-filter, and a method for protecting an air-filter medium against microbial degradation by incorporating in, or on, the medium a microbiologically effective amount of a polymeric biguanide or salt thereof.

14 Claims, No Drawings

AIR FILTER

CROSS REFERENCE TO RELATED APPLICATIONS

This application is a national phase application based on PCT/GB00/02878, filed Jul. 26, 2000, and which further claims priority from British Application No. 9919127.2, filed Aug. 13, 1999. These applications in their entirety are incorporated herein by reference.

The present invention relates to an air filter for a circulating and/or recirculating air system comprising a filter medium containing a biologically effective amount of a polymeric biguanide. The invention also relates to a method for reducing odours and air-borne micro-organisms comprising passing air through a filter medium containing the biologically effective amount of a polymeric biguanide.

Air filters are commonly used to remove particulate matter in a wide range of air circulation systems. They may be in the form of bags or envelopes (commonly known as Sack filters) through which air is blown or as pads or papers which are used in a frame. Sack filters have a high collection efficacy for removing particles such as dust and combustion products such as tobacco smoke. The filtration media used in air filters is made from a wide range of materials but is most commonly a woven or non-woven fabric.

Examples of air systems which incorporate these filters include the air conditioning and central heating systems of residential, office and recreational buildings, aeroplanes, automobiles and hospitals. The filtration requirements of different environments varies widely. Air filtration is of particular importance in industrial clean rooms and especially in hospital environments such as wards and surgical rooms.

Air-borne micro-organisms can cause a particular problem in air filtration systems since after removal from the air stream they can remain viable on the filtration medium. This can result in a proliferation of these micro-organisms and lead to widespread contamination of the air circulation system. This in turn can have wide ranging effects varying from a reduction in filter efficiency to the generation of foul odours from odoriferous microbial by-products. In addition the presence of large numbers of microbes in re-circulating air has been implicated as a possible cause of "sick building syndrome". To avoid these problems the filtration medium may be treated with antimicrobial agents to inhibit the growth of microbes such as bacteria, fungi, viruses, algae, yeasts and protozoa.

A particular problem in hospital environments is the control or elimination of pathogens, especially Gram-positive pathogens, for example *Staphylococci, Enterococci, Streptococci* and mycobacteria. Many of these pathogens have developed resistant strains, for example methicillin resistant *staphylococcus* (MRSA), methicillin resistant coagulase negative *staphylococci* (MRCNS), penicillin resistant *Streptococcus pneumoniae* and multiply resistant *Enterococcus faecium*. Once established these resistant strains are difficult to treat and eradicate from the hospital environment because they are resistant to conventional antibiotics such as penicillin and methicillin. The particulate matter collected in air filter media, especially organic matter, can act as a source of nutrients for such resistant pathogens and result in their proliferation both on the filter and into the air stream passing through the filter. There is therefore a need for an air filter which inhibits or eliminates the growth of such pathogens. Hitherto this has proved difficult to achieve.

We have found that the incorporation of a polymeric biguanide or salt thereof in or on the filtration medium used in air filters results in the filtration medium exhibiting excellent activity against a range of micro-organisms and that air which has passed through such filter medium exhibits reduced odour and/or a reduction in air-borne micro-organisms. These biguanides show advantage over alternative antimicrobial agents in their broad spectrum of activity, low toxicity, ease of application and substantivity on the filter medium.

According to a first aspect of the present invention there is provided an air-filter for a circulating and/or recirculating air system comprising a filter medium containing a microbiologically effective amount of a polymeric biguanide or salt thereof.

Preferably, the polymeric biguanide contains at least two biguanide units of Formula (1):

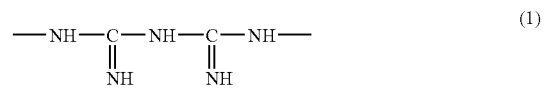

(1)

which are linked by a bridging group which contains at least one methylene group. The bridging group may include a polymethylene chain which may be optionally substituted by hetero atoms such as oxygen, sulphur or nitrogen. The bridging group may include one or more cyclic nuclei which may be saturated or unsaturated. Preferably, the bridging group is such that there are at least three, and especially at least four, carbon atoms directly interposed between two adjacent biguanide units of formula 1. Preferably, there are not greater than 10 and especially not greater than eight carbon atoms interposed between two adjacent biguanide units of Formula (1).

The polymeric biguanide may be terminated by any suitable group which may be a hydrocarbyl or substituted hydrocarbyl group or an amine or a cyanoguanidine group.

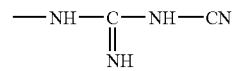

When the terminating group is a hydrocarbyl group, it may be alkyl, cycloalkyl or aralkyl.

When the terminating group is a substituted hydrocarbyl group, the substituent may be any substituent that does not exhibit undesirable adverse effects on the microbiological properties of the polymeric biguanide. Examples of such substituents or substituted hydrocarbyl groups are aryloxy, alkoxy, acyl, acyloxy, halogen and nitrile.

When the polymeric biguanide contains two biguanide groups of formula 1, the two biguanide groups are preferably linked through a polymethylene group, especially a hexamethylene group and the biguanide is a bisbiguanide.

The terminating groups in such bisbiguanides are preferably $C_{1-10}$-alkyl which may be linear or branched and optionally substituted aryl, especially optionally substituted phenyl. Examples of such terminating groups are 2-ethyl hexyl and 4-chloro phenyl. Specific examples of such bisbiguanides are compounds represented by Formula (2) and (3) in the free base form.

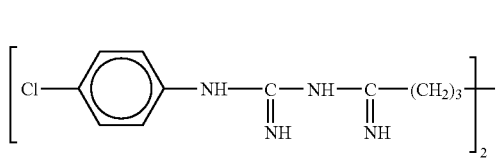

(2)

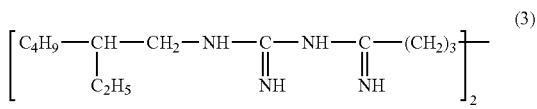

(3)

The polymeric biguanide preferably contains more than two biguanide units of Formula (1) and is preferably a linear polymeric biguanide which has a recurring polymeric chain represented by Formula (4):

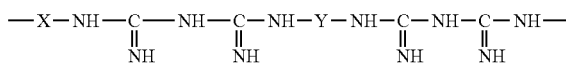

(4)

wherein X and Y represent bridging groups in which together the total number of carbon atoms directly interposed between the pairs of nitrogen atoms linked by X and Y is more than 9 and less than 17.

The bridging groups X and Y may consist of polymethylene chains, optionally interrupted by hetero atoms, for example, oxygen, sulphur or nitrogen. X and Y may also incorporate cyclic nuclei which may be saturated or unsaturated, in which case the number of carbon atoms directly interposed between the pairs of nitrogen atoms linked by X and Y is taken as including that segment of the cyclic group, or groups, which is the shortest. Thus, the number of carbon atoms directly interposed between the nitrogen atoms in the group.

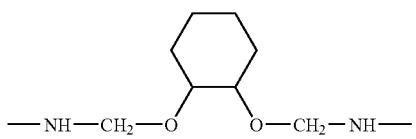

is 4 and not 8.

The linear polymeric biguanides having a recurring polymer unit of Formula (4) are typically obtained as mixtures of polymers in which the polymer chains are of different lengths. Preferably, the number of individual biguanide units of formulae:

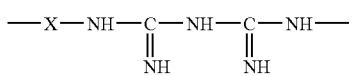

and

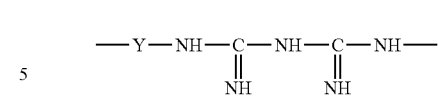

is, together, from 3 to about 80, wherein X and Y are as hereinbefore defined.

Preferably X and Y are each, independently a polymethylene chain, more preferably hexamethylene (i.e. $-(CH_2)_6-$).

The preferred linear polymeric biguanide is a mixture of polymer chains represented by Formula (5) in the free base form:

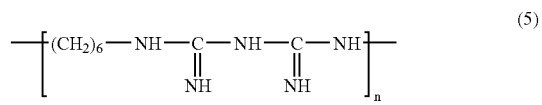

(5)

wherein n is from 4 to 40 and especially from 4 to 15. It is especially preferred that the average value of n is about 12. Preferably, the average molecular weight of the polymer in the free base form is from 1100 to 3300.

Linear biguanides may be prepared by the reaction of a bisdicyandiamide having the formula:

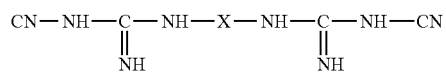

with a diamine $H_2N-Y-NH_2$, wherein X and Y have the meanings defined above or by reaction between a diamine salt or dicyanimide having the formula:

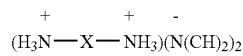

with a diamine $H_2N-Y-NH_2$ wherein X and Y have the meanings defined above. These methods of preparation are described in UK specifications numbers 702,268 and 1,152,243 respectively, and any of the polymeric biguanides described therein may be used.

As noted hereinbefore, the polymer chains of the linear polymeric biguanides may be terminated either by an amino group or by a cyanoguanidine group.

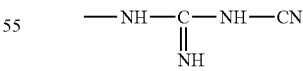

This cyanoguanidine group can hydrolyse during preparation of the linear polymeric biguanide yielding a guanidine end group. The terminating groups may be the same or different on each polymer chain.

A small proportion of a primary amine $R-NH_2$, where R represents an alkyl group containing from 1 to 18 carbon atoms, may be included with the diamine $H_2N-Y-NH_2$ in the preparation of polymeric biguanides as described above. The primary monoamine acts as a chain-terminating agent and consequently one or both ends of the polymeric biguanide polymer chains may be terminated by an —NHR group. These chain-stopped polymeric biguanides may also be used.

The polymeric biguanides readily form salts with both inorganic and organic acids. The choice of acid depends primarily on whether a water soluble or water insoluble salt of the polymeric biguanide is desired for the preparation of the air filter. The choice of salt will depend largely on the type of medium used as the filter. In many instances, it will be convenient to use a water soluble salt of the polymeric biguanide. Where the polymeric biguanide is represented by a compound of Formula (2) in the free base form, a preferred water soluble salt is the digluconate. Where the polymeric biguanide is represented by a compound of Formula (3) in the free base form, a preferred water soluble salt is the diacetate and where the much preferred polymeric biguanide is a mixture of linear polymers represented by Formula (5) in the free base form, the preferred salt is the hydrochloride.

The polymeric biguanide will also form solvent soluble salts with organic acids containing from 4 to 30 carbon atoms. The organic acid which forms the solvent soluble salt with the polymeric biguanide may contain a phosphonic, phosphoric, sulphonic or sulphate group but preferably contains a carboxylic acid group. The organic acid may be aromatic but is preferably aliphatic, including alicyclic. When the organic acid is aliphatic, the aliphatic chain of the organic acid may be linear or branched, saturated or unsaturated, including mixtures thereof. Preferably, the aliphatic chain is linear and it is also preferred that the organic acid is an aliphatic carboxylic acid.

It is preferred that the organic acid which forms the solvent soluble salt with the polymeric biguanide contains not less than eight, more preferably not less than ten and especially not less than twelve carbon atoms excluding the acid group. Preferably, the organic acid contains not greater than 24, more preferably not greater than 20 and especially not greater than 18 carbon atoms excluding the acid group.

The organic acid which forms the solvent soluble salt with the polymeric biguanide may contain more than one acid group but it is preferred that only one such group is present.

The organic acid which forms the solvent soluble salt with the polymeric biguanide may be substituted by a halogen or particularly a hydroxy group. It is, however, preferred that the organic acid is free from substituents.

Some aliphatic carboxylic acids are available commercially as mixtures such as those obtained from animal fats and vegetable oils and these contain both saturated and unsaturated aliphatic chains. These have also been found useful, especially the $C_{14-18}$-alkyl carboxylic acids and their fully saturated or hydrogenated analogues.

Examples of optionally substituted carboxylic acids are valeric, hexanoic, octanoic, 2-octenoic, lauric, 5-dodecenoic, myristic, pentadecanoic, palmitic, oleic, stearic, eicosanoic, heptadecanoic, palmitoleic, ricinoleic, 12-hydroxystearic, 16-hydroxyhexadecanoic, 2-hydroxycaproic, 12-hydroxydodecanoic, 5-hydroxydodecanoic, 5-hydroxydecanoic, 4-hydroxydecanoic, dodecanedioic, undecanedioic, sebacic, benzoic, hydroxbenzoic and teraphthalic acids. The preferred organic aliphatic carboxylic acid is stearic acid.

The organic acid solvent soluble salt of the polymeric biguanide may be made by any method known to the art but is preferably made by precipitation of the biguanide from aqueous solution by addition of the organic acid under alkaline conditions. The organic acid salts of the biguanide may be further purified by dissolution in a suitable organic liquid which is preferably immiscible with water and washing the organic phase with water to remove any residual water soluble salts.

The filter medium may be made from natural polymer or synthetic polymeric plastics material. Examples of natural polymeric materials are cellulose, such as viscose and wood pulps; silicates such as glass; and wool. Examples of synthetic polymeric plastics materials include polyesters such as polyethylene terephthalate; polyamides such as nylon 6,6 and 6,10; polyurethanes; polyacrylamides including those containing carboxylic and sulphonic and groups; and polyolefines such as polyethylene and polypropylene. A preferred polymeric material is cellulose.

The filter medium may contain the polymeric material in any suitable physical form which allows for the passage of air. Thus, the polymeric material may be in the form of sheet, fibres, flakes, chips and granules, including combinations thereof. When the filter medium is made from fibres, it may be either woven or non-woven. The non-woven fibres may be either dry-laid or wet-laid and are preferably in the form of a felt or sheet. It is preferred that the fibres are woven. Especially preferred fibres are cellulosic for example cotton or viscose fibres.

The amount of polymeric biguanide or salt thereof which is contained by the filter medium may vary over wide limits. Preferably, the amount of polymeric biguanide is not less than 0.0001%, more preferably not less than 0.05% and especially not less than 0.3% based on the weight of filter medium. It is also preferred that the amount of polymeric biguanide is not greater than 10%, more preferably not greater than 5% and especially not greater than 1% by weight of the filter medium. Useful effects have been obtained when the amount of polymeric biguanide is from 0.4% to 2% by weight of the filter medium.

The polymeric biguanide may be applied to the filter medium by any means known to the art. Thus, where the polymeric biguanide or its salt is a solid it may be added to the filter medium and uniformly distributed by mixing, such as stirring or shaking. Preferably, however, the polymeric biguanide is added to the filter medium from a solution or dispersion in an appropriate liquid medium. When the polymeric biguanide or its salt is soluble in water, the liquid medium is preferably water and when the polymeric biguanide is soluble in an organic liquid the liquid medium is preferably an organic solvent such as $C_{1-4}$-alkanols, ketones, ethers, esters, aromatic and aliphatic hydrocarbons including halogenated derivaties thereof. When desired the polymeric biguanide may also be applied from an emulsion which may be a water-in-oil or oil-in-water emulsion. When the polymeric biguanide is applied to the filter medium as a dispersion or emulsion it is preferably uniformly distributed throughout the continuous phase by means of an appropriate dispersant or emulsifying agent. When the filter medium is a synthetic polymeric plastics material, the polymeric biguanide may be uniformly distributed throughout the plastics material by any means known to the art such as coating granules, chips or flakes with the polymeric biguanide. Where the polymeric biguanide is applied from a liquid medium, the liquid is preferably removed by evaporation. The coated granules, chips or flakes may be fabricated into sheets or fibres by appropriate heat treatment such as melt extrusion and melt spinning. It is preferred, however, that the polymeric biguanide is applied to the surface of the filter medium.

It is especially preferred that the filter medium comprises cellulosic fibres and that the polymeric biguanide is PHMB in the form of its hydrochloride salt. It is also preferred that the PHMB is applied from aqueous solution.

In an embodiment of the present invention the air-filter further comprises an odour control agent. We have found that the presence of an odour control agent in conjunction with the polymeric biguanide is particularly effective for controlling odour when the air being filtered is contaminated by odorous components. Examples of such odorous components include combustion products such as smoke produced from tobacco products; fats and grease arising from the preparation of foods; and gaseous/volatile emissions resulting from the handling and processing of chemicals.

Suitable odour control agents include activated carbon, zeolites, cyclodextrins and undecylenic acids and derivatives thereof.

The odour control agent may be incorporated into the filter by any convenient means for example one of the methods hereinbefore discussed in relation to incorporating the polymeric biguanide. A preferred method is to impregnate the filter medium with a solution or dispersion containing the odour control agent. The solution or dispersion containing odour control agent may be applied before, after or simultaneously with the polymeric biguanide. It is preferred however, that when an odour control agent is used, it is incorporated into the filter separately from the medium containing the polymeric biguanide. This may be achieved for example by incorporating an additional filter medium impregnated with the odour control agent into the filter.

A preferred method for incorporating a solid odour control agent such as activated carbon is to incorporate it as a layer in the filter.

In a preferred embodiment of the present invention the filter medium comprises a hereinbefore described filter medium containing a polymeric biguanide and a layer containing the odour control agent. Preferably the layer containing the odour control agent is sandwiched between an inner and outer layer comprising one or more of the hereinbefore described filter media, wherein at least one or preferably both, of the inner and outer layers contain the polymeric biguanide or salt thereof. It is especially preferred that the inner and outer layers comprise cellulosic fibres (especially cotton or non-woven viscose fabric) impregnated with PHMB (preferably in the form of its hydrochloride salt). It is also especially preferred that the odour control agent is selected from an activated carbon and a cyclodextrin.

It is known that micro-organisms grow and proliferate in the presence of an organic nutrient and water and that the growth of micro-organisms can be inhibited by contacting the micro-organism with a biologically active compound. This contact is generally mediated by water. It has now been found that the growth of micro-organisms in the filter medium of a circulating and/or recirculating air system grow and proliferate under "dry" conditions and can be inhibited by contacting the micro-organism with the filter medium containing a polymeric biguanide under "dry" conditions. By "dry" conditions it is meant air having a relative humidity between 20% and 80%. The filter medium containing the polymeric biguanide has been found especially effective at controlling odours and the growth of micro-organisms when the relative humidity of the circulating air is 55%+15%.

As noted hereinbefore, the filter medium containing the polymeric biguanide has been found to reduce odours in air circulated through the filter medium containing the polymeric biguanide and/or reduce the amount of air-borne micro-organisms. Thus, according to a further aspect of the invention there is provided a method of reducing odours and/or air-borne micro-organisms in circulating and/or recirculated air which comprises passing the air through a filter medium containing a polymeric biguanide.

Again, as noted supra, the growth of micro-organisms on or in the air-filter of a circulating and/or recirculating air system can reduce the efficacy of the air filter either by inhibiting the flow of air through the filter caused by microbial growth and/or degradation of the filter medium. The incorporation of a polymeric biguanide in the air-filter mitigates against such loss of efficacy. Hence, according to a further aspect of the invention there is provided a method for protecting the filter medium of a circulating and/or recirculating air system against microbial degradation which comprises incorporating in, or on, the filter medium a microbiologically effective amount of a polymeric biguanide or salt thereof.

The polymeric biguanide may be applied to the filter medium using conventional methods known in the art, for example as discussed hereinbefore in relation to the first aspect of the present invention.

The invention is now further illustrated by the following non-limiting examples wherein all references are to parts and percentages by weight unless indicated to the contrary.

EXAMPLE 1

Example 1 demonstrates that bacteria are able to survive on a "dry" cotton air filtration medium under humid conditions.

A 24 hour broth culture of *Staphylococcus aureus*—Oxford Strain (NCTC 6571) was counted, using a haemocytometer, and diluted with physiological saline to $10^7$ cells per ml.

Polypropylene boxes (approximately 5 cm deep base and 6 cm high with a transparent lid) were sterilised and filled with a 3 cm deep layer of vermiculite saturated with sterile distilled water. The system as set up was essentially acting as a humidity chamber.

To check the inoculum procedure the following experiment was carried out. Seven petri dishes, containing solid nutrient agar, were placed onto the surface of the saturated vermiculite in each of two chambers. The lids of the petri dishes were removed, and the chamber lids sealed into place. The humidity chamber lids had a 4 cm×2 cm 'window' cut into one short side. Through this 'window' the inoculum was sprayed using a compressed air spray gun. Following inoculation, the 'windows' were sealed shut and the duplicate chambers incubated at 37° C. for 24 hours. At the end of this time the agar petri dishes were evaluated for survival and distribution of the inoculum.

TABLE 1

Effectiveness of the aerosol as a means of inoculation

| Location of Plates in Chamber | Description of Bacterial Growth |
| --- | --- |
| Back Left | Each plate had several hundred individual colonies evenly distributed across the surface of the agar. |
| Back Right | |
| Centre Left | |
| Centre Right | |
| Centre | |
| Front Left | |
| Front Right | |

The results in Table 1 show that in the experimental protocol the inoculum is evenly distributed The survival of microbes on a cotton air filtration medium in this system and the influence of its position within the humidity chamber was then evaluated as follows. Five inverted sterile petri dish bases were pressed down into the saturated vermiculite, to provide a dry platform for the cotton. A 5 cm$^2$ (0.24 g) piece of untreated cotton was placed into each petri dish base, and the lid of the chamber sealed into place. Duplicate chambers were prepared. The chambers were then inoculated as described above, sealed and incubated at room temperature for one hour. The chambers were then unsealed and the cotton pieces treated in one of two ways:

Dilution Counts—Each of the five cotton pieces was placed into 10 ml of inactivation liquid (2% polysorbate plus 0.3% azolectin inactivation liquid for PHMB) and a serial dilution pour plate count carried out with physiological saline, into nutrient agar. These plates were then incubated at 37° C. for 24 hours.

Overlay Method—Each of the five cotton pieces was placed onto the surface of nutrient agar and further cool molten agar poured over to completely cover them. These plates were also incubated at 37° C. for 24 hours. Results are shown in Table 2.

TABLE 2

Survival of *Staphylococcus aureus* on Cotton

| Location of Cotton in Chamber in relation to inoculation 'window' | Count cfu/ml | Overlay |
|---|---|---|
| Back Left | $1.5 \times 10^4$ | ++ |
| Back Right | $5.8 \times 10^3$ | ++ |
| Centre | $1.7 \times 10^4$ | ++ |
| Front Left | $1.1 \times 10^4$ | ++ |
| Front Right | $3.1 \times 10^3$ | ++ | cfu = Colony forming units
− = No colonies visible
+ = A few colonies visible
++ = Moderate number of colonies The results in Table 2 show that micro-organisms are able to survive on a "dry" substrate in the humidity chamber and confirm that the inoculum is evenly spread throughout the chamber.

EXAMPLE 2

Example 2 demonstrates the ability of a cotton filtration medium treated with 1% PHMB hydrochloride to inhibit bacteria when compared with an untreated control sample.

Four humidity chambers and a $10^7$ cells/ml inoculum of *Staphylococcus aureus* were prepared as described in Example 1. Three samples of untreated cotton (5 cm$^2$) and three samples of cotton dipped in a solution of PHMB hydrochloride and air dried were placed onto six inverted petri dish bases in each chamber. Each chamber was inoculated and incubated as described in Example 1. Duplicate untreated and treated cotton pieces were removed at time intervals of 15 minutes, 1 hour and 4 hours. The cotton pieces were treated as described in Example 1 under Dilution Counts and Overlay Method.

TABLE 3

Comparison of PHMB Treated Cotton with Untreated Cotton

| Contact Time | Sample | Count | Overlay |
|---|---|---|---|
| 15 Minutes | Untreated | $3.5 \times 10^4$ | ++ |
|  | 1% PHMB | $0 \times 10^1$ | 3 colonies |
| 1 Hour | Untreated | $1.9 \times 10^5$ | ++ |
|  | 1% PHMB | $0 \times 10^1$ | 0 colonies |
| 4 Hours | Untreated | $4.8 \times 10^4$ | ++/+ |
|  | 1% PHMB | $0 \times 10^1$ | 1 colony |

+ = Less than 20 colonies
++ = Moderate growth
+++ = Dense confluent growth

The results shown in Table 3 demonstrate the PHMB effectively eradicates *Staphylococcus aureus* inoculated onto a cotton air filtration medium.

EXAMPLE 3

These experiments show the antimicrobial effect of an air filtration medium treated with PHMB hydrochloride when evaluated by an alternative protocol.

A bacterial cell suspension of *Staphylococcus aureus* was prepared in sterile saline to give a final nominal concentration of $10^6$ cells/ml suspension. Aliquots (0.1 ml) of the cell suspension were spread separately across the surface of eight nutrient agar plates and the plate was allowed to dry under sterile conditions. Four untreated pieces (2.5 cm$^2$) of cotton and four pieces of cotton dipped in 1% PHMB hydrochloride and air dried were placed separately onto them (one piece/plate).

At contact times of 0, 15 minutes, 1 hour and 4 hours, an untreated and a treated piece of cotton were removed from the agar surfaces. When all the cotton pieces had been removed the plates were incubated at 37° C. for 48 hours and the areas where the cotton had been in contact with the agar surface were examined for viable colonies of *Staphylococcus aureus*.

Growth became established in the areas which were in contact with untreated cotton. At all contact times growth was eliminated in areas on the agar surfaces which had been in contact with cotton treated with PHMB.

The test results indicate that under the conditions of this agar contact method:
 a) An Untreated cotton filtration medium does not prevent the growth of *Staphylococcus aureus*.
 b) A Cotton filtration medium treated with a 1% solution of PHMB shows bactericidal activity against *Staphylococcus aureus*.

EXAMPLE 4

An air filtration medium was soaked in an aqueous solution of 0.4% of PHMB hydrochloride and allowed to dry. The sample was used to make two air filters one of which was kept unused and the other which was run in an air cleaning machine in an office for two weeks. Both samples were evaluated for the degree of contamination by both bacteria and fungi compared to controls not treated with PHMB hydrochloride by the following protocol.

Small samples were cut from each filter, and placed upon nutrient agar for detection of bacteria, and on malt agar for detection of fungi. Nutrient agar was incubated for 48 hours at 37 C, and malt agar for 7 days at 25 C.

TABLE 4

Bacterial Contamination

| Filtration medium | Use | Contamination |
| --- | --- | --- |
| PHMB treated | Unused | None |
|  | Used | None |
| Untreated | Unused | Moderate |
|  | Used | Heavy |

TABLE 5

Fungal Contamination

| Filtration medium | Use | Contamination |
| --- | --- | --- |
| PHMB treated | Unused | None |
|  | Used | Moderate |
| Untreated | Unused | Moderate |
|  | Used | Heavy |

Tables 4 and 5 show that an air filtration medium treated with PHMB is able to control the growth of fungi and bacteria both before and after use.

EXAMPLE 5

Evaluation of the samples described in Example 4 via a recognised industry test, AATCC Test Method 147. A culture of *Staphylococcus aureus* was grown overnight in nutrient broth and diluted 1:10 in sterile water. Inoculating loops were loaded with inoculum, and 5 streaks approximately 60 mm long and 10 mm apart were made across the surface of a petri dish of nutrient agar. Care was taken not to break the agar surface, and the loops were not reloaded. Plates were allowed to dry in air under sterile conditions. Strips of the filtration medium, 25×65 mm, were transferred aseptically across the 5 streaks and gently pressed onto the agar surface with a sterile loop.

Plates were incubated at 37° C. for 24 hours, and the growth of bacteria on the filter and zone of inhibition surrounding the filter assessed.

TABLE 6

AATCC 147 Test with *S. aureus*

| Treatment | Use | Bacterial growth on filter | Zone of inhibition |
| --- | --- | --- | --- |
| 0.4% PHMB | Unused | None | 1 mm |
|  | Used | None | 0 mm |
| Untreated | Unused | Strong | None |
|  | Used | Strong | None |

Thus, an air filtration medium treated with PHMB inhibits the growth of *S. aureus* both before and after use in a re-circulating air system.

EXAMPLE 6

A comparison of the antimicrobial efficacy of an air filtration medium treated with PHMB with one treated with 3 (trimethoxysilyl) propyl octadecyidimethyl ammonium chloride using an established industry test method, AATCC Test Method 30.

A fruiting culture of *Aspergillus niger* was swabbed for spores with a sterile cotton bud. The spores were dispersed in a conical flask containing 50 ml sterile water and a few glass beads. 1 ml of the spore dispersion was pipetted onto the surface of a petri dish containing Czapek Dox agar. A sample (2.5×2.5 cm) was placed onto the surface of the inoculated agar. A further 0.2 ml of spore suspension was pipetted onto the sample surface. The inoculated plates were incubated at 25 C in the dark for 7 days. Fungal growth was assessed. Three samples were evaluated; untreated cotton; cotton treated with 0.25% PHMB by soaking and allowing to dry; cotton treated with 0.55% 3-(trimethoxysilyl) propyl octadecyidimethyl ammonium chloride by soaking, drying and curing at 100-120° C.

TABLE 7

Activity of PHMB compared to a 3 (trimethoxysilyl) propyl octadecyldimethyl ammonium chloride

| Sample | Encroachment over test sample surface AATCC 30 test | Zone of inhibition mm |
| --- | --- | --- |
| Untreated Cotton | total | 0 |
| Cotton treated with 3 (trimethoxysilyl) propyl octadecyldimethyl ammonium chloride | total | 0 |
| Cotton treated with PHMB | ~25% coverage | 0 |

EXAMPLE 7 EFFICACY OF AN AIR FILTRATION MEDIUM TREATED WITH PHMB USED IN A HOSPITAL ENVIRONMENT

Air filters were set up and run in an open ward at Macclesfield General Hospital, United Kingdom, to test the efficacy of a PHMB treated filter compared to a non-treated filter.

The filter media used in the tests consisted of a layer of activated carbon sandwiched between two layers of woven cotton fabric. The treated filters were treated with PHMB by applying a uniform coating of a 20% solution of PHMB hydrochloride to the cotton fabric on the air input side of the filter medium followed by air drying.

Samples of the air were taken at various points within the ward with an air cleaning filter unit running with either a standard filter, or a PHMB treated filter. The effect of the filters on the airborne microbial population was assessed using the following protocol:

Determination of Microbial Population of The Air

The number of culturable micro-organisms within a known volume of air, sampled from the hospital ward, was determined using an M Air T air sampler. The air sampler was pre-set to sample 1000 liters (1 cubic meter) of air, which took approximately 5 minutes. The collected air was passed over a tryptone soya agar, a general purpose agar which will support the growth of a wide variety of micro organisms. The inoculated plates were then incubated at room temperature for 4 days prior to visual assessment and enumeration of bacterial colonies.

The air sampler was positioned at the same places within the ward for each set of air samples and was left running continuously for 7 days prior to taking the air sample. To allow any effects of the filter to dissipate before testing another a gap of a two to three days was left between each part of the test. Two air samples were taken for each filter and each test was repeated. The average of the four measurements is shown in Table 8:

TABLE 8

Microbial Air Counts (Micro-organisms per cubic meter of air) in filters after 7 days continuous running:

| Filter Location | Filter | Microbial Count/m³ |
|---|---|---|
| Nurses Station | PHMB treated | not tested |
| | Untreated | 284 |
| 2nd Bay | PHMB treated | 130 |
| | Untreated | 332 |
| 3rd Bay | PHMB treated | 121 |
| | Untreated | 291 |
| 1st Bay | PHMB treated | ~324 |
| (barrier nursing) | Untreated | ~700 |

Table 8 clearly shows that the PHMB treate filters reduced the airborne microbial count by approximately 60% compared to the untreated filters.

Number of Micro-organisms Recovered per Gram of used Filter

Samples from the treated and untreated filters described above from various positions in the hospital were evaluated for the degree of contamination by bacteria following 7 and 10 days of continuous use by the following protocol.

Small samples were cut from each filter, placed upon tryptone soya agar and incubated for 4 days at room temperature. The bacterial counts per gram of filter are shown in Table 9.

TABLE 9

Number of bacteria per gram of used filter medium

| | | Average Bacterial Count | |
|---|---|---|---|
| Filter | Location | 7 Days Running | 10 Days Running |
| PHMB Treated | Ward 1 | 4.00 × 10³ | — |
| Untreated | | 2.30 × 10⁵ | |
| PHMB Treated | Ward 2 | 7.00 × 10² | — |
| Untreated | | 2.30 × 10⁴ | — |
| PHMB Treated | Ward 3 | 1.00 × 10³ | 1.60 × 10³ |
| Untreated | | 1.10 × 10⁵ | 8.60 × 10⁴ |
| PHMB Treated | Ward 4 | 8.00 × 10² | 1625 |
| Untreated | | 8.10 × 10⁴ | 86250 |

A "—" in Table 9 indicates that the bacterial count was not performed

Table 9 shows that the number of bacteria on the PHMB treated filter medium was reduced by about 98% compared to that on an untreated filter medium.

The invention claimed is:

1. An air-filter for a circulating and/or recirculating air system comprising a filter medium containing a microbiologically effective amount of a polymeric biguanide or salt thereof, wherein said polymeric biguanide is terminated by a functional group selected from the group consisting of hydrocarbyl, substituted hydrocarbyl, amine, and a cyanoguanidine group,

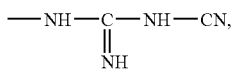

wherein said substituted hydrocarbyl is aryloxy, alkyloxy, acyl, acyloxy, or nitrile.

2. An air-filter as claimed in claim 1, wherein the polymeric biguanide contains at least two biguanide units of the Formula (1):

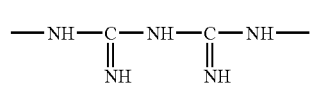

which are linked by a bridging group which contains at least one methylene group.

3. An air-filter as claimed in claim 1 wherein the polymeric biguanide is a mixture of linear polymeric biguanides having a recurring polymer chain represented by Formula (4):

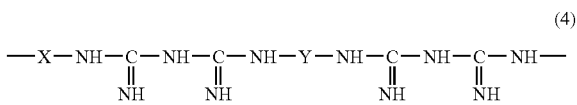

wherein X and Y represent bridging groups in which together the total number of carbon atoms directly interposed between pairs of nitrogen atoms linked by X and Y is more than 9 and less than 17.

4. An air-filter as claimed in claim 3 which is a mixture of polymers wherein the number of individual biguanide units of formulae:

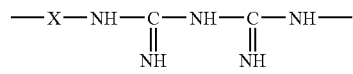

and

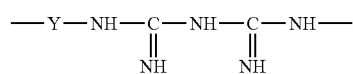

is, together, from 3 to about 80.

5. An air-filter as claimed in claim 3 wherein the polymeric biguanide is poly(hexamethylene biguanide) in which X and Y are both —(CH₂)₆—.

6. An air-filter as claimed in claim 1 wherein the polymeric biguanide is a mixture of polymers of the Formula (5):

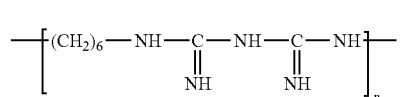

wherein n is from 4 to 40.

7. An air-filter as claimed in claim 1 wherein the polymeric biguanide is in the form of a hydrochloride salt.

8. An air-filter as claimed in claim 1 wherein the filter medium is made from a natural polymer or synthetic plastics material.

9. An air-filter as claimed in claim 8 wherein the natural polymer is cellulose.

10. An air-filter as claimed in claim 1 wherein the amount of polymeric biguanide contained on the filter medium is from 0.0001% to 10% based on the weight of the filter medium.

11. A air-filter according to claim 1 further comprising an odour control agent.

12. A method of reducing odours and/or air-borne microorganisms in circulating and/or recirculated air which comprises passing air through a filter medium containing a polymeric biguanide or salt thereof, wherein said polymeric biguanide is terminated by a functional group selected from the group consisting of hydrocarbyl, substituted hydrocarbyl, amine, and a cyanoguanidine group,

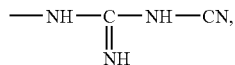

wherein said substituted hydrocarbyl is aryloxy, alkyloxy, acyl, acyloxy, or nitrile.

13. A method as claimed in claim 12 wherein the air has a relative humidity between 20% and 80%.

14. A method for protecting a filter medium of a circulating and/or recirculating air system against microbial degradation which comprises incorporating in, or on, the medium a microbiologically effective amount of a polymeric biguanide or salt thereof, wherein said polymeric biguanide is terminated by a functional group selected from the group consisting of hydrocarbyl, substituted hydrocarbyl, amine, and a cyanoguanidine group,

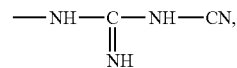

wherein said substituted hydrocarbyl is aryloxy, alkyloxy, acyl, acyloxy, or nitrile.

* * * * *